US008184591B2

(12) United States Patent
Pani et al.

(10) Patent No.: US 8,184,591 B2
(45) Date of Patent: May 22, 2012

(54) HANDLING CELL RESELECTIONS AND STATE TRANSITIONS FOR HIGH-SPEED DOWNLINK PACKET ACCESS

(75) Inventors: Diana Pani, Montreal (CA); Rocco DiGirolamo, Laval (CA); Paul Marinier, Brossard (CA)

(73) Assignee: InterDigital Technology Corporation, Wilmington, DE (US)

( * ) Notice: Subject to any disclaimer, the term of this patent is extended or adjusted under 35 U.S.C. 154(b) by 760 days.

(21) Appl. No.: 12/112,103

(22) Filed: Apr. 30, 2008

(65) Prior Publication Data

US 2008/0267130 A1    Oct. 30, 2008

Related U.S. Application Data

(60) Provisional application No. 60/915,048, filed on Apr. 30, 2007, provisional application No. 60/944,661, filed on Jun. 18, 2007, provisional application No. 60/944,540, filed on Jun. 18, 2007, provisional application No. 60/955,578, filed on Aug. 13, 2007.

(51) Int. Cl.
*H04W 36/00*    (2009.01)
(52) U.S. Cl. ........................ 370/331; 455/436
(58) Field of Classification Search .................. None
See application file for complete search history.

(56) References Cited

U.S. PATENT DOCUMENTS

| 2003/0016698 A1 | 1/2003 | Chang et al. |
| 2003/0207702 A1 | 11/2003 | Chen |
| 2005/0070252 A1 | 3/2005 | Farnsworth |

FOREIGN PATENT DOCUMENTS

| EP | 1 973 364 | 9/2008 |
| WO | WO 02/082666 A2 | 10/2002 |

OTHER PUBLICATIONS

Interdigital, "Correction to UE Behavior to Disable HS-DSCH Operation When HS-DSCH Reception Is Unavailable", Change Request, 25.331 CR3079, Current Version 7.5.0, 3GPP TSG-WG2 Meeting #59, R2-073697, (Athens, Greece, Aug. 20-24, 2007).
Interdigital, "Additional Cases of MAC-ehs Reset for UEs Operating in Enhanced CELL_FACH," 3GPP TSG-RAN WG2#59, R2-073179 (Aug. 20-24, 2007).
Interdigital, "Cell Reselection Issues during RRC Connection Establishment Procedure," 3GPP TSG-RAN WG2#59, R2-073178 (Aug. 20-24, 2007).
Interdigital, "Disabling HS-DSCH Operation when HS-DSCH Reception is Unavailable," 3GPP TSG RAN WG2#59, R2-073180 (Aug. 20-24, 2007).
Nokia et al., "Introduction of HS-DSCH reception in CELL_FACH, URA_PCH and CELL_PCH", Change Request, 25.331 CR3003, Rev. 2, Current Version 7.4.0, 3GPP TSG-WG2 Meeting #58, R2-072305, (Kobe, Japan, May 7-11, 2007).
Nokia et al., "Introduction of Enhanced CELL_FACH state", Change Request, 25.331, Current Version 7.3.0, 3GPP TSG-2 Meeting #57, R2-071556, (St. Julian's, Malta, Mar. 26-30, 2007).

(Continued)

*Primary Examiner* — Robert Scheibel
(74) *Attorney, Agent, or Firm* — Eric Berkowitz

(57) ABSTRACT

A wireless transmit receive unit (WTRU) is configured to operate in an high speed data packet access (HSDPA) mode in a cell and/or state and to clear HSDPA resources when moving out of the cell and/or state. The WTRU is configured to clear HSDPA resources when conditions to perform high speed downlink shared channel reception are not met.

12 Claims, 3 Drawing Sheets

OTHER PUBLICATIONS

Nokia et al., "Introduction of HS-DSCH Reception in CELL_FACH; URA_PCH and CELL_PCH," R2-072305 (May 7-11, 2007).

Nsn et al., "Introduction of HS-DSCH Reception in CELL_FACH, URA_PCH and CELL_PCH," 3GPP TSG RAN 2#58, R2-0.72168, Kobe, Japan (May 6-11, 2007).

Third Generation Partnership Project, "Enhanced CELL_FACH state in FDD", RP-060606, (Sep. 25, 2006).

Third Generation Partnership Project, "Technical Specification Group Radio Access Network; High Speed Downlink Packet Access (HSDPA); Overall Description; Stage 2 (Release 6)," 3GPP TS 25.308 V6.4.0 (Apr. 2007).

Third Generation Partnership Project, "Technical Specification Group Radio Access Network; High Speed Downlink Packet Access (HSDPA); Overall Description; Stage 2 (Release 7)," 3GPP TS 25.308 V7.2.0 (Apr. 2007).

Third Generation Partnership Project, "Technical Specification Group Radio Access Network; High Speed Downlink Packet Access (HSDPA); Overall Description; Stage 2 (Release 7)," 3GPP TS 25.308 V7.6.0 (Mar. 2008).

Third Generation Partnership Project, "Technical Specification Group Radio Access Network; High Speed Downlink Packet Access (HSDPA); Overall Description; Stage 2 (Release 8)," 3GPP TS 25.308 V8.1.0 (Mar. 2008).

Third Generation Partnership Project, "Technical Specification Group Radio Access Network; Radio Resource Control (RRC); Protocol Specification (Release 6)," 3GPP TS 25.331 V6.13.0 (Mar. 2007).

Third Generation Partnership Project, "Technical Specification Group Radio Access Network; Radio Resource Control (RRC); Protocol Specification (Release 6)," 3GPP TS 25.331 V6.17.0 (Apr. 2008).

Third Generation Partnership Project, "Technical Specification Group Radio Access Network; Radio Resource Control (RRC); Protocol Specification (Release 7)," 3GPP TS 25.331 V7.4.0 (Apr. 2007).

Third Generation Partnership Project, "Technical Specification Group Radio Access Network; Radio Resource Control (RRC); Protocol Specification (Release 7)," 3GPP TS 25.331 V7.5.0 (Jul. 2007).

Third Generation Partnership Project, "Technical Specification Group Radio Access Network; Radio Resource Control (RRC); Protocol Specification (Release 7)," 3GPP TS 25.331 V7.8.0 (Mar. 2008).

Third Generation Partnership Project, "Technical Specification Group Radio Access Network; Radio Resource Control (RRC); Protocol Specification (Release 8)," 3GPP TS 25.331 V8.2.0 (Apr. 2008).

Third Generation Partnership Project, "Technical Specification Group Radio Access Network; MAC Protocol Specification (Release 6)," 3GPP TS 25.321 V6.12.0 (Mar. 2007).

Third Generation Partnership Project, "Technical Specification Group Radio Access Network; MAC Protocol Specification (Release 6)," 3GPP TS 25.321 V6.15.0 (Mar. 2008).

Third Generation Partnership Project, "Technical Specification Group Radio Access Network; MAC Protocol Specification (Release 7)," 3GPP TS 25.321 V7.4.0 (Mar. 2007).

Third Generation Partnership Project, "Technical Specification Group Radio Access Network; MAC Protocol Specification (Release 7)," 3GPP TS 25.321 V7.8.0 (Mar. 2008).

Third Generation Partnership Project, "Technical Specification Group Radio Access Network; MAC Protocol Specification (Release 8)," 3GPP TS 25.321 V8.1.0 (Mar. 2008).

Nokia et al., "Introduction of HS-DSCH reception in $CELL_{13}$ FACH, URA_PCH and CELL_PCH", Change Request, 25.331 CR3003, Rev. 2, Current Version 7.4.0, 3GPP TSG-WG2 Meeting #58, R2-072305, (Kobe, Japan, May 7-11, 2007).

Nokia et al., "Introduction of Enhanced $CELL_{13}$ FACH state", Change Request, 25.331, Current Version 7.3.0, 3GPP TSG-2 Meeting #57, R2-071556, (St. Julian's, Malta, Mar. 26-30, 2007).

Interdigital, "Disabling HS-DSCH Operation when HS-DSCH Reception is Unavailable," 3GPP TSG RAN WG2 #59, R2-073180 (Aug. 20-24, 2007).

Nokia et al., "Introduction of HS-DSCH reception in CELL_FACH, URA_PCH", Change Request, 25.331 CR3003, Rev. 2, Current Version 7.4.0, 3GPP TSG-WG2 Meeting #58, R2-072305, (Kobe, Japan, May 7-11, 2007).

Nsn et al., "Introduction of HS-DSCH Reception in CELL_FACH, URA_PCH and CELL_PCH," 3GPP TSG RAN 2 #58, R2-0.72168, Kobe, Japan (May 6-11, 2007).

Third Generation Partnership Project, "Technical Specification Group Radio Access Network; High Speed Downlink Packet Access (HSDPA); Overall Desciption; Stage 2 (Release 7)," 3GPP TS 25.308 V7.6.0 (Mar. 2008).

Third Generation Partnership Project, "Technical Specification Group Radio Access Network; High Speed Downlink Packet Access (HSDPA); Overall Decription; Stage 2 (Release 8)," 3GPP TS 25.308 V8.1.0 (Mar. 2008).

Third Generation Partnership Project, "Technical Specification Group Radio Access Network; Radio Resource Control (RRC); Protocol Specification (Release 7)," 3GPP TS 25.331 V7.8.0 (Mar. 2007).

3rd Generation Partnership Project (3GPP), R2-072267, "Introduction of HS-DSCH reception in CELL_FACH; URA_PCH and CELL_PCH; CR3003 to 25.331", R2-072267; 3GPP TSG-WG2 Meeting 58, Kobe, Japan, May 15, 2007, 3 pages.

International Patent Application No. PCT/US2008/061901: International Search Report dated Jan. 29, 2009, 6 pages.

International Patent Application No. PCT/US2008/061901: Notification of Transmittal of International Preliminary Report on Patentability dated Aug. 20, 2009, 13 pages.

International Patent Application No. PCT/US2008/061901: Written Opinion dated Jan. 29, 2009, 12 pages.

International Patent Application No. PCT/US2008/061984: International Search Report dated Oct. 31, 2008, 3 pages.

International Patent Application No. PCT/US2008/061984: Notification of Transmittal of International Preliminary Report on Patentability dated Apr. 06, 2009, 7 pages.

International Patent Application No. PCT/US2008/061984: Written Opinion dated Oct. 31, 2008, 8 pages.

HANDLING CELL RESELECTIONS AND STATE TRANSITIONS FOR HIGH-SPEED DOWNLINK PACKET ACCESS

CROSS REFERENCE TO RELATED APPLICATIONS

This application claims the benefit of U.S. Provisional Application Nos. 60/915,048, filed Apr. 30, 2007, 60/944,661, filed Jun. 18, 2007, 60/944,540, filed Jun. 18, 2007, and 60/955,578, filed Aug. 13, 2007, which are incorporated by reference as if fully set forth.

FIELD OF INVENTION

The present application is related to wireless communication.

BACKGROUND

Wireless transmit receive units (WTRUs) in a UMTS Terrestrial Radio Access Network (UTRAN) can be in either of two modes: Idle or Connected. Based on WTRU mobility and activity while in connected mode, the UTRAN can direct the WTRU to transition between a number of radio resource control (RRC) sub-states: Cell_PCH, URA_PCH, Cell_DCH and Cell_FACH. The Cell-PCH and URA_PCH states are used to trigger cell updates on a paging channel (PCH) for a mobile WTRU. The Cell_DCH state is characterized by dedicated channels (DCHs) in both the uplink and the downlink. On the WTRU side, this corresponds to continuous transmission and reception and can be demanding on user power requirements. The Cell_FACH state is characterized by a forward access channel (FACH) and does not use dedicated channels, thus allowing better power consumption, at the expense of a lower uplink and downlink throughput.

Recent work by the standardization bodies has identified the possibility of using high speed downlink packet access (HSDPA) in Cell_FACH and Cell_PCH/URA_PCH. HSDPA is a feature that was introduced in Release 5 of the 3rd Generation Partnership Project (3GPP) specifications to operate in Cell_DCH. HSDPA tries to make better use of the downlink shared capacity by using three key concepts: Adaptive Modulation and Coding (AMC), retransmissions using a Hybrid-ARQ (HARQ) scheme, and Node B scheduling, all operating at a very fast rate.

The following HSDPA characteristics are relevant:
a. Every WTRU having a HSDPA connection is assigned a high speed downlink scheduling channel (HS-DSCH) Radio Network Temporary Identifier (H-RNTI). This identifier is unique within a cell and assigned by the serving Radio Network Controller (RNC).
b. A WTRU is attached to a single serving cell (Node B).
c. The WTRU has to receive indication of the physical channel resources to use (HS-PDSCH info), as well as how to set up the HARQ processes and the HARQ memory.

In 3GPP Release 6, HSDPA was only supported in Cell_DCH. Therefore, when moving out of Cell_DCH state, all HSDPA resources had to be cleared. However, with the introduction of enhanced Cell_FACH the WTRU may move from Cell_DCH to any other state and still support HS-DSCH reception, which may not require the WTRU to clear all HSDPA resources. Therefore, an additional condition was added to the variable HS_DSCH_RECEPTION associated with HS-DSCH reception in Cell_DCH. The HSDPA resources are only cleared when the requirements to perform HS-DSCH reception are not met and the WTRU is in Cell_DCH.

It is assumed that if a WTRU supports HSDPA in Release 7, it also supports HSDPA in Cell_FACH and in Cell_PCH/URA_PCH. HS-DSCH reception in Cell_FACH can be configured without HS-DSCH reception in Cell_PCH and URA_PCH. HS-DSCH reception in Cell_PCH and URA_PCH without the support of HS-DSCH reception in Cell_FACH is not supported. The WTRU support for these features is signaled by the WTRU to the network.

The network signals its support for enhanced Cell_FACH via the System Information Block (SIB5/5bis) to the WTRU. Two new information elements (IEs) have been introduced:
a. "HS-DSCH common system information"—indicating the HSDPA reception is supported for Cell_FACH state; and
b. "HS-DSCH paging system information"—indicating that HSDPA is supported for Cell_PCH/URA_PCH state.

To indicate whether HS-DSCH reception is ongoing in Cell_FACH, two new Boolean variables have been introduced, which are used as flags by the WTRU radio resource control (RRC) controller:
a. HS_DSCH_RECEPTION_Cell_FACH_STATE: If TRUE indicates that HS_DSCH reception in Cell_FACH reception is ongoing; and
b. HS_DSCH_RECEPTION_OF_CCCH_OF_ENABLED: If TRUE indicates that HS-DSCH reception is enabled for CCCH. This variable is set to TRUE when the WTRU is using a common H-RNTI to receive HSDPA traffic, and is set to FALSE when the WTRU is not.

However, no new variable has been defined for HS-DSCH reception indication in Cell_PCH or URA_PCH states. When in Cell_PCH or URA_PCH, and if the IE "HS-DSCH paging system information" is broadcasted, the WTRU sets up HSDPA reception.

Scenarios can occur where the WTRU transitions from Cell_DCH to a state that does not support HSDPA. For instance, the WTRU could transition from Cell_DCH to Cell_FACH in a cell that does not support the Enhanced Cell_FACH feature, or the WTRU could transition from Cell_DCH to Cell_PCH in a cell that does not support HS-DSCH reception in Cell_PCH. In such scenarios the HSDPA resources are not cleared and the WTRU will continue to perform HS-DSCH reception procedures. This behavior is undesirable since the WTRU will waste resources and battery while attempting to receive on this channel. In addition, failure to clear HSDPA resources (i.e. clear IEs, release HARQ resources, performing enhanced high speed medium access channel (MAC-ehs) reset) is likely to cause problems when the WTRU resumes HS-DSCH reception in another state.

Similar problems occur in some scenarios of cell reselection. For instance, the WTRU may reselect from a cell that supports HS-DSCH in CELL to a cell that does not support the Enhanced Cell_FACH feature and the HSDPA resources are not cleared.

SUMMARY

A method and apparatus for cell reselection in 3GPP wireless communication is implemented by a wireless transmit/receive unit (WTRU) that supports HS-DSCH reception. When in cell transition or state transition, the WTRU checks whether there is an ongoing HS-DSCH reception, and if the new cell or state cannot support HS-DSCH, then the HSDPA resources being used for the ongoing HS-DSCH reception are released. The WTRU performs this method using radio resource control (RRC) processing, which monitors various events and conditions to make the determination whether to release HSDPA resources.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a long term evolution enhanced NodeB (eNB), a site controller, an access point (AP), or any other type of interfacing device capable of operating in a wireless environment.

The terms "clearing and releasing of HSDPA resources" and "stopping of HS-DSCH reception procedures" are herein used interchangeably.

When referred to hereafter, the terminology "3GPP Release 7 (R7)", includes but is not limited to a WTRU or Node B that supports HS-DSCH in CELL_FACH and/or CELL/URA_PCH and "3GPP Release 6 (R6)" includes but is not limited to a WTRU or Node B that supports HS-DSCH in CELL_FACH and/or CELL/URA_PCH.

HS-DSCH in CELL_FACH also includes HS-DSCH reception in idle mode for the reception of RRC connection procedures.

Figure 1:
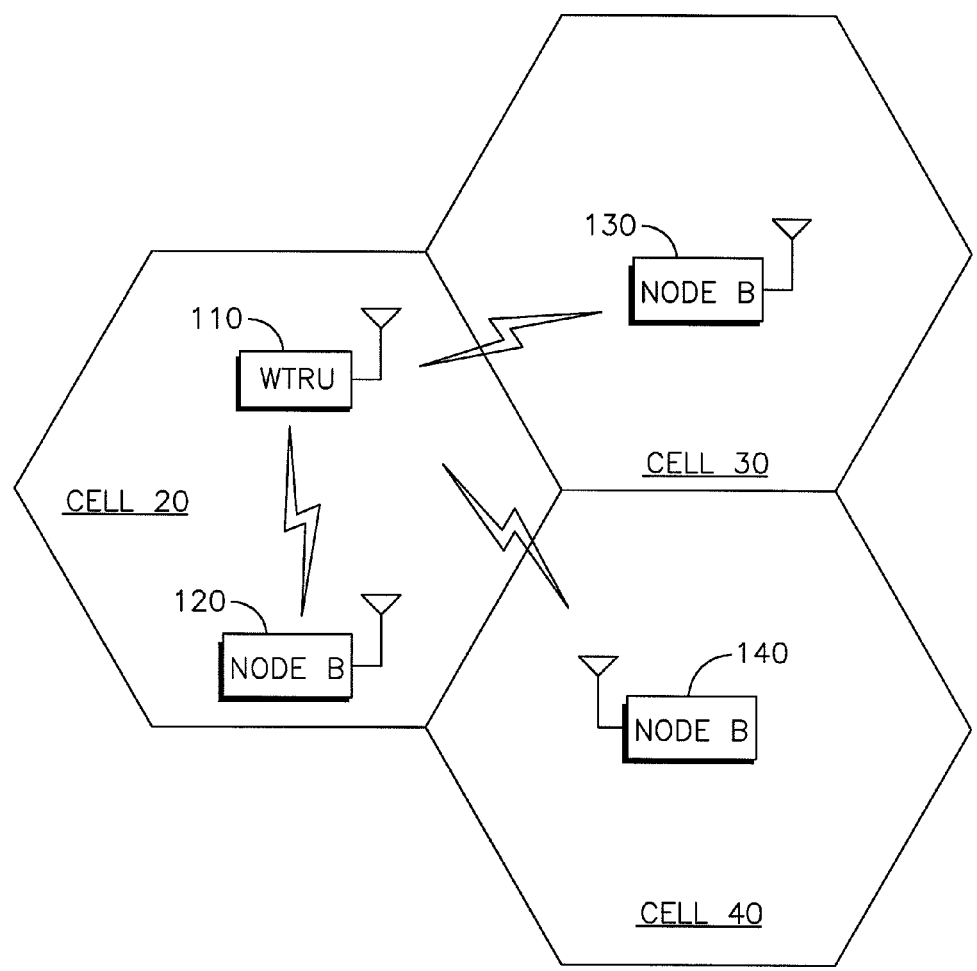
FIG. 1 shows a block diagram of a wireless transmit/receive unit (WTRU) and a various Node B candidates for cell/state reselection.

FIG. 1 shows an example wireless communication system 100 of cells 20, 30 and 40, with NodeBs 120, 130 and 140 respectively. A mobile WTRU 110 is in communication with a serving Node B 120, and NodeBs 130 and 140 are candidates for cell reselection. It should be noted that, although an example configuration of WTRU 110 and Node B 120 is depicted in FIG. 1, any combination of wireless and wired devices may be included in the wireless communication system 100.

Figure 2:
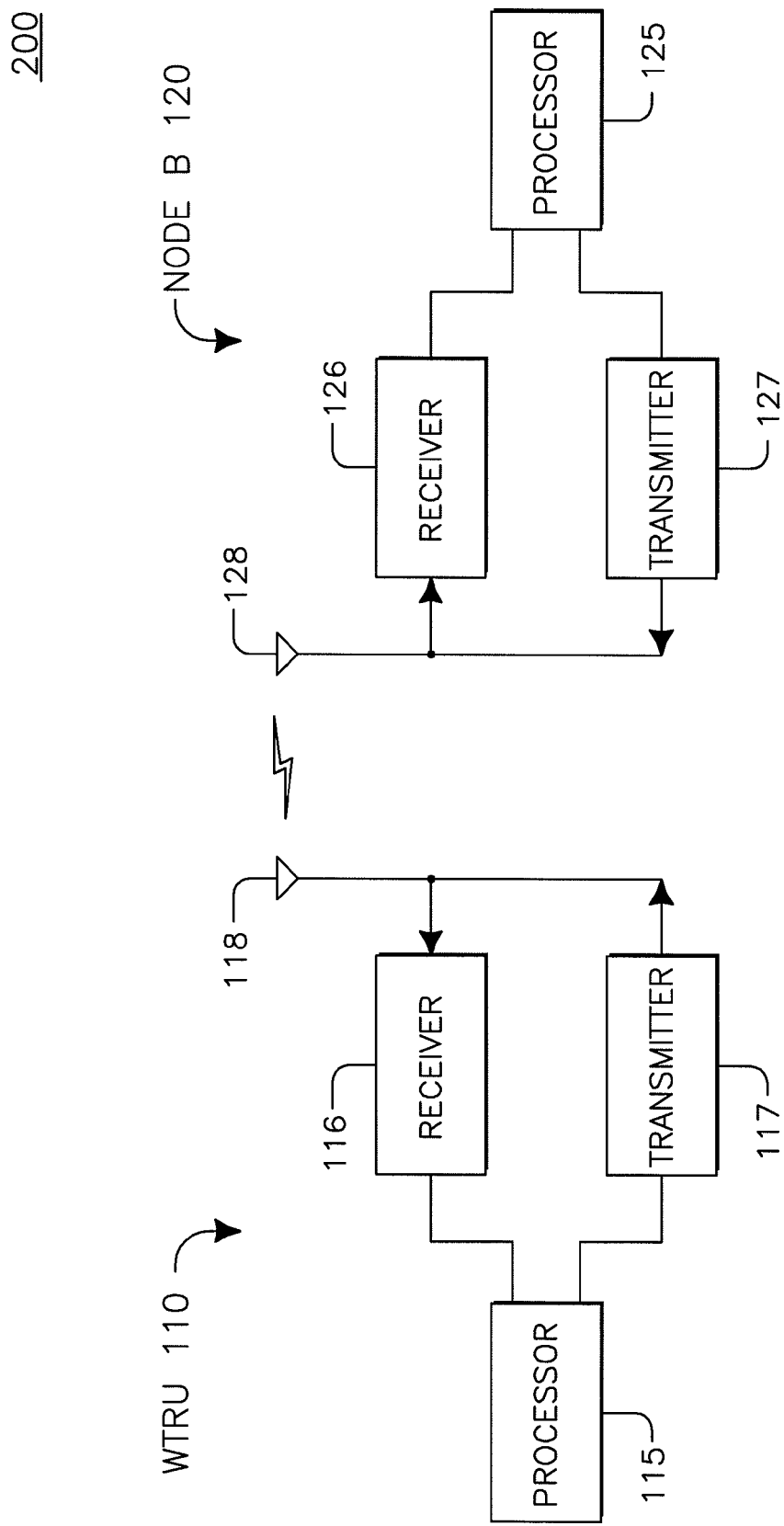
FIG. 2 is an example functional block diagram of a WTRU and the Node B of FIG. 1.

FIG. 2 is an example functional block diagram 200 of a WTRU 110 and the Node B 120 of the wireless communication system 100 of FIG. 1. As shown in FIG. 2, the WTRU 110 is in communication with the Node B 120.

In addition to the components that may be found in a typical WTRU, the WTRU 110 includes a processor 115, a receiver 116, a transmitter 117, and an antenna 118. The receiver 116 and the transmitter 117 are in communication with the processor 115. The antenna 118 is in communication with both the receiver 116 and the transmitter 117 to facilitate the transmission and reception of wireless data. The processor 115 of the WTRU 110 is configured to handle cell reselections and state transitions to and from an enhanced Cell_FACH state.

In addition to the components that may be found in a typical Node B, the Node B 120 includes a processor 125, a receiver 126, a transmitter 127, and an antenna 128. The receiver 126 and the transmitter 127 are in communication with the processor 125. The antenna 128 is in communication with both the receiver 126 and the transmitter 127 to facilitate the transmission and reception of wireless data. The processor 125 of the Node B 120 is configured to support enhanced Cell_FACH state.

Embodiments are disclosed that deal with state/cell transitions from a state or cell where HS-DSCH reception is possible, to a state or cell where HS-DSCH reception is not possible.

Cell Reselection

In this case, the WTRU is not waiting for a CELL UPDATE CONFIRM from the network. That is, the WTRU is in state Cell_FACH, and makes a cell re-selection. The cell reselection process can be considered a 2-step process. The first step sets up the HSDPA communication in the new cell, if this new cell is 3GPP R7 capable. The second step deals with the clearing of information from the old cell. This second step should consider all possible transitions that may occur: 3GPP R7 cell to R7 cell, 3GPP R7 cell to R6 Cell, 3GPP R6 cell to R7 cell, and 3GPP R6 cell to R6 cell. Any time a cell reselection to a 3GPP R6 cell occurs, any HSDPA configuration should be removed (a complete HSDPA reset). On the other hand, if a transition is to a 3GPP R7 capable cell, only a MAC-hs reset would be needed. Further, the first step should specifically check that a cell reselection is occurring. The second clause is specific to cell reselection. If cell is not 3GPP R7 capable, then a complete HSDPA reset is performed (stop monitoring HS-SCCH and HS-PDSCH, mac-hs reset, release of HARQ resources). This reset can be implemented by specifying the individual actions, or by using the variables (HS_DSCH_RECEPTION_Cell_FACH_STATE & HS_DSCH_RECEPTION_OF_CCCH) and performing required actions.

State Transitions

Transitions from Cell_DCH

Transitions from Cell_DCH state can be requested through a number of RRC messages, such as:

RADIO BEARER SETUP
RADIO BEARER RECONFIGURATION
RADIO BEARER RELEASE
TRANSPORT CHANNEL RECONFIGURATION
PHYSICAL CHANNEL RECONFIGURATION

When performing procedures related to these messages, a WTRU may be asked to transition from Cell_DCH state to Cell_FACH, Cell_PCH, and URA_PCH. Depending on the cell capabilities, the states being entered can support HSDPA or not (3GPP R7 cells support HSDPA in Cell_FACH, Cell_PCH, URA_PCH, while 3GPP R6 cells do not). As a result, any transition to a non-HSDPA state from a HSDPA state should result in a complete HSDPA reset (stop monitoring HS-SCCH & HS-PDSCH, mac-hs reset, release of HARQ resources). However, for transitions to a state that supports HSDPA no reset is needed.

Currently, the resetting is performed when evaluating the variable HS_DSCH_RECEPTION. If this variable was "TRUE" and becomes "FALSE" after the evaluation, then a complete HSDPA reset is performed provided that the UE is in state Cell_DCH.

In accordance with this embodiment, the WTRU 110 performs a reset (i.e., release of HSDPA resources) in cases where the WTRU 110 moves to states that do not support HSDPA. This can be determined from the presence or absence of the IE "Downlink HS-PDSCH system information" or "HS-DSCH common system information" in System Information Block 5 and/or the presence or absence of the IE "Downlink HS-PDSCH system information for connected mode" in System Information Block 6.

Transitions from Cell_FACH

State transitions out of Enhanced Cell_FACH state have the same issue as transitions out of Cell_DCH. That is, any time a transition is to a state that does not support HSDPA, a complete HSDPA reset should be required. The resetting is performed when evaluating the variable HS_DSCH_RECEPTION_Cell FACH_STATE. If this variable is "TRUE" and becomes "FALSE" after the evaluation, then a complete HSDPA reset is performed provided that the WTRU is in state Cell_FACH and the variable HS_DSCH_RECEPTION_OF_CCCH is "FALSE". This reset is also performed in cases where the WTRU 110 transitions to states that do not support HSDPA.

An explicit check of the variable is made when the WTRU 110 receives any RRC message that causes a transition from Cell_FACH to Cell_PCH or URA_PCH. This includes commands such as:

RADIO BEARER SETUP
RADIO BEARER RECONFIGURATION
RADIO BEARER RELEASE
TRANSPORT CHANNEL RECONFIGURATION
PHYSICAL CHANNEL RECONFIGURATION
CELL UPDATE CONFIRM

To determine whether or not the state to which the WTRU 110 transitioned supports HSDPA, the WTRU 110 can use the presence or absence of the IE "Downlink HS-PDSCH system information" or "HS-DSCH common system information" in System Information Block 5 and/or the presence or absence of the IE "Downlink HS-PDSCH system information for connected mode" in System Information Block 6.

General Overview

The WTRU 110 clears HSDPA resources and stops HS-DSCH reception procedures when the WTRU 110 moves from a state or cell in which it is performing HS-DSCH reception (e.g., a 3GPP Release 7 capable state or cell) to a state or cell in which it no longer supports HS-DSCH reception (e.g., a 3GPP Release 6 capable state or cell).

When the WTRU 110 attempts to establish a HSDPA connection as a result of a state transition, and/or cell change (cell re-selection), and the conditions required to perform HS-DSCH reception are not met, the WTRU 110 clears the HSDPA resources. The WTRU 110 can always clear the HSDPA resources or it clears HSDPA resources only if the previous state or cell had an ongoing HS-DSCH reception procedure.

The actions related to clearing of HSDPA resources and stopping HS-DSCH reception procedures include, but are not limited to the following:

stopping any HS-SCCH reception/monitoring procedures;
stopping any HS-DSCH reception/monitoring procedures;
clearing the variable H_RNTI and remove any stored H-RNTI;
resetting the MAC-hs/ehs entity; and
releasing all HARQ resources.

If more resources are added to the HS-DSCH connection procedures, the WTRU 110 may also clear those resources. For example, the WTRU 110 may also need to clear the common H-RNTI values or any IEs stored (e.g., HARQ info).

Checking if HS-DSCH Reception is Ongoing

In some scenarios, the WTRU 110 needs to check if there is an ongoing HS-DSCH reception procedure (i.e., prior to state transition, configuration, cell reselection, and the like). In order to check if there is an ongoing HS-DSCH reception procedure, one or a combination of the following procedures may be used:

A new Boolean HS-DSCH reception variable HS_DSCH_RECEPTION GENERAL may be defined by the processor 115 used for the radio resource control (RRC) processing, and used to act as a flag to indicate whether HS-DSCH reception is ongoing in any of the four states Cell_FACH, Cell_DCH, Cell_PCH, URA_PCH. For example, this may be implemented by a RRC controller function in the processor 115. The variable is set to TRUE when HS-DSCH reception is supported and started in any state, and it is set to FALSE when stopping HS-DSCH reception and/or when HS-DSCH reception is not supported.

A new state variable HS_DSCH_RECEPTION_PCH_STATE for Cell_PCH/URA_PCH state may be defined by the processor 115 for RRC processing (e.g., in a RRC controller function of the processor 115) and used to check if HS-DSCH reception is ongoing in the Cell_PCH/URA_PCH state.

The existing HS_DSCH reception variables (HS_DSCH_RECEPTION, HS_DSCH_RECEPTION_Cell_FACH_STATE, HS_DSCH_RECEPTION_OF_CCCH_ENABLED, or HS_DSCH_RECEPTION_PCH_STATE) may also be used if applicable. If any of these variables is set to TRUE, it means that a HS-DSCH reception procedure is ongoing. For example, if the WTRU 110 is in Cell_FACH and wants to know if HS-DSCH reception is ongoing, in addition to the state variable (i.e. HS_DSCH_RECEPTION_Cell_FACH_STATE), the WTRU 110 also checks all other HS-DSCH reception variables.

A MAC-ehs state indication may be used to denote ongoing HSDPA reception. This could include a newly defined state indicator, special reserved values for MAC-ehs state variables (next_expected_TSN, T1), or whether any HARQ resources have been configured. Only the last option is included in the embodiments using a MAC-ehs state indication. For proper operation of the state indication, the HARQ resources should be cleared when not using HSDPA.

Conditions for Releasing HS-DSCH Resources

The proper behavior of the WTRU 110 may be defined according to one or a combination of the following RRC procedures in the processor 115. The WTRU 110 first checks for the following HS-DSCH reception criteria, which is monitoring whether any of the following events have occurred:

a. State transitions due to RRC reconfigurations, RRC setup, RRC release messages:
    i. Cell_DCH to Cell_FACH, Cell_PCH, or URA_PCH;
    ii. Cell_FACH to Cell_PCH, or URA_PCH;
b. Cell Update and cell reselection cases:
    i. Radio Link failure (from Cell_DCH to Cell_FACH);
    ii. Cell reselection from Cell_FACH to Cell_FACH;
    iii. Cell reselection from Cell_PCH to Cell_FACH;
c. Cell reselection in idle mode while waiting for RRC CONNECTION SETUP message (i.e. resending RRC CONNECTION REQUEST due to cell reselection):
    i. Cell reselection in URA_PCH (i.e. when reading the SIB5/5bis and SIB6/6bis);
d. Timer T302 expiry of cell reselection;

Alternatively, this check may done in other procedures and cases where the WTRU 110 check for HS-DSCH reception is supported (i.e. reading of SIB5/5bis, SIB 6/6bis actions).

The WTRU 110 further checks the following conditions to ascertain whether HS-DSCH reception is supported in the new state:

Following a state transition to Cell_FACH state, the WTRU 110 checks:
- for TDD; or
- for FDD, if the WTRU does not support HS-DSCH reception; or
- if the IE "HS-DSCH common system information" is not included in System Information Block type 5 or System Information Block type 5bis Following a state transition to Cell_PCH or URA_PCH, the WTRU 110 checks:
- for TDD; or
- for FDD, if the WTRU does not support HS-DSCH reception; or
- if the IE "HS-DSCH paging system information" is not included.

When one of these above conditions is TRUE, the WTRU 110 takes the action of clearing the HSDPA resources. As a first variation, the HSDPA resources may always be cleared upon satisfying any of the above conditions. As a second variation, the HSDPA resources are cleared upon any of the above conditions and if HS-DSCH reception was previously ongoing in any of the other states prior to the start of the RRC procedure.

In order to check if the WTRU 110 supports HS-DSCH reception in CELL_FACH and/or CELL_PCH/URA_PCH, an additional WTRU capability may be added, instead of just checking whether the WTRU 110 supports HS-DSCH reception. For example, the following additional WTRU capabilities may be added to the RRC procedure:
a. HS-DSCH support in Cell_FACH (i.e., only for Cell_FACH);
b. HS-DSCH support in Cell_PCH or URA_PCH (which also implies HS-DSCH support in Cell_FACH).

If such capabilities are added, the WTRU 110 would perform these checks as part of the steps described above.

Actions Related to Clearing HSDPA Resources

To perform the actions related to clearing HSDPA resources, the WTRU processor 115 executes one or a combination of the following:
a. Clearing HSDPA resources when the when the conditions to start HS-DSCH reception are not met.
b. When HS-DSCH reception criteria are not met AND if HS-DSCH reception is ongoing for the current state of the WTRU 110 (i.e. HS_DSCH_RECEPTION_GENERAL set to TRUE), then the variable HS_DSCH_RECEPTION_GENERAL is set to FALSE and HSDPA resources are cleared.
c. Evaluate and perform the actions corresponding to the existing HS-DSCH reception variables or any newly introduced variable (i.e. for Cell_PCH/URA_PCH). The variables to be evaluated can be one or a combination of the following:
  i. HS_DSCH_RECEPTION variable;
  ii. HS_DSCH_RECEPTION_Cell_FACH_STATE variable;
  iii. HS_DSCH_RECEPTION_OF_CCCH_ENABLED variable; or
  iv. A variable for Cell_PCH/URA_PCH If the conditions to set one of these variables to TRUE are not met, the WTRU 110 may use one of the procedures described herein to check if there is an ongoing HS-DSCH reception. If there is an ongoing HS-DSCH connection, then the WTRU may release all HSDPA resources. Alternatively, the WTRU may release all HSDPA resources whenever the variable which is being evaluated is set to FALSE.

d. The evaluation and actions corresponding to variables of HS-DSCH reception in Cell_FACH and Cell_PCH/URA_PCH are only done when the conditions to perform HS-DSCH reception are met. As part of this option, these variables and/or actions are executed even when the conditions are not met in the procedures described above.
e. In addition to one of the changes performed above, the actions related the HS_DSCH_RECEPTION variable for Cell_DCH can be modified to clear the resources if the conditions to perform HS-DSCH reception in Cell_FACH and Cell_URA/Cell_PCH are not met. This will only solve one of the problems identified (moving out of Cell_DCH to any other state).

The above methods described for checking if HS-DSCH reception is ongoing, performing RRC actions, and performing the actions related to HSDPA clearing may be combined together to solve the problems identified.

HSDPA Variable Applicable to all States

The Boolean variable HS_DSCH_RECEPTION_GENERAL is set to TRUE depending on whether the WTRU 110 has been configured to start HS-DSCH reception. When the WTRU 110 first powers up, this variable is set to FALSE. As part of the idle mode procedure, the WTRU 110 then sends a RRC Connection request message. When the message is sent, the WTRU 110 processes the received downlink to confirm that the network supports HS-DSCH (e.g., by checking flags in the SIB5/5bis). If HS-DSCH is supported, the WTRU 110 performs actions associated with HS_DSCH_RECEPTION_OF_CCCH variable: if TRUE, then it means that HS-DSCH reception is ongoing. Accordingly, the variable HS_DSCH_RECEPTION_GENERAL is also set to TRUE. The HS_DSCH_RECEPTION_GENERAL is set to TRUE in any of the four states, when the conditions to start HS-DSCH reception are met. Below are described instances when the variable is set to TRUE. The variable HS_DSCH_RECEPTION_GENERAL is defined and controlled by the WTRU processor 115, the variable acting as a flag to indicate whether HS-DSCH reception is ongoing in any of the four states Cell_DCH, Cell_FACH, Cell_PCH and URA_PCH. The WTRU 110 relies on this variable to check if there is an ongoing HS-DSCH reception procedure. If the variable HS_DSCH_RECEPTION_GENERAL is set to TRUE, it implies that there is an ongoing HS-DSCH reception procedure. If the WTRU 110 cannot support HS-DSCH reception in the new state/cell upon state/cell transition, the WTRU 110 clears all HSDPA resources and sets the variable HS_DSCH_RECEPTION_GENERAL to FALSE. In order to ensure that this variable is properly set at all times, this variable is set based on the actions associated with HS-DSCH reception in all the states.

The HS_DSCH_RECEPTION_GENERAL variable is set to TRUE when any of the requirements to setup HS-DSCH reception in the appropriate states are met and the HS-DSCH reception is started. This can happen in any of the following cases:
a. HS_DSCH_RECEPTION is set to TRUE in Cell_DCH;
b. HS_DSCH_RECEPTION_Cell_FACH_STATE is set to TRUE in Cell_FACH;
c. HS_DSCH_RECEPTION_OF_CCCH_ENABLED is set to TRUE in Cell_FACH and idle when the WTRU has a common H-RNTI;
d. Actions related to HS-DSCH reception in Cell_PCH/URA_PCH are executed and the conditions are met; and
e. the IE "HS-DSCH common system information" is included in System Information Block type 5 or System Information Block type 5bis (e.g., during Radio Bearer Setup, Radio Bearer Reconfiguration, Radio Bearer Release, Transport channel Reconfiguration, or PHY channel reconfiguration.

When the above requirements associated with the HS-DSCH reception variables for the different states are not met and any of the above mentioned HS-DSCH reception variables are set to FALSE, the HS_DSCH_RECEPTION_GENERAL should also be set to FALSE.

Additionally, if the existing variables are modified or an additional variable is added for the states Cell_PCH and URA_PCH, the setting of HS_DSCH_RECEPTION_GENERAL may be correlated to the setting of the modified or new variables, as described above. Whenever HS-DSCH reception is properly setup, the variable HS_DSCH_RECEPTION_GENERAL is set to TRUE. Whenever HS-DSCH reception is stopped and/or not supported in the state/cell WTRU is operation on, it should be set to FALSE.

Actions Related to Variable HS_DSCH_RECEPTION_GENERAL

When the WTRU 110 is performing initiation procedures related to acquiring system information to setup in the new cell or the new state, the WTRU 110 checks if HSDPA is supported. When HS-DSCH reception is not supported, the WTRU 110 performs secondary common control physical channel (S-CCPCH) selection, and the WTRU 110 may clear HS-DSCH resources if an HS-DSCH reception procedure is ongoing, and the WTRU 110 sets the HS_DSCH_RECEPTION_GENERAL variable to FALSE.

The WTRU 110 can check if HS-DSCH reception is ongoing by checking the variable HS_DSCH_RECEPTION_GENERAL. If this variable is set to TRUE, and the WTRU 110 does not support HSDPA in the its current state/cell (i.e., the new state/cell upon transition), the WTRU sets this variable to FALSE, and performs the following steps related to clearing HSDPA resources:

a. stop any HS-SCCH reception procedures;
    b. stop any HS-DSCH reception procedures;
    c. clear the variable H_RNTI and remove any stored H-RNTI;
    d. reset the MAC-hs entity;
    e. release/reset all HARQ resources;
    f. clear any stored IEs HARQ information.

For TDD and for FDD, whenever the variable HS_DSCH_RECEPTION_GENERAL is set to FALSE, the WTRU 110:

does not perform a HS_SCCH reception procedure;
    does not perform a HS_DSCH reception procedure.

It should be noted that if any criteria changes for checking for support of HS-DSCH reception for the cell and WTRU, the above described procedures associated with WTRU 110 actions to clear HSDPA resources according to the variable HS_DSCH_RECEPTION_GENERAL may still be applied.

For the above scenarios under this embodiment, the WTRU 110 ensures that the HS_DSCH_RECEPTION_GENERAL variable is set to FALSE. Optionally, the WTRU 110 can also ensure that all other HS-DSCH variables are also set to FALSE. In addition, the WTRU 110 releases any HSDPA resources and stops HS-DSCH reception procedures, if any HS-DSCH reception is ongoing. The HS_DSCH_RECEPTION_GENERAL variable is also set to FALSE when the WTRU is entering UTRA RRC connected mode when not otherwise stated in the RRC procedure, and when the WTRU is leaving UTRA RRC connected mode.

Figure 3:
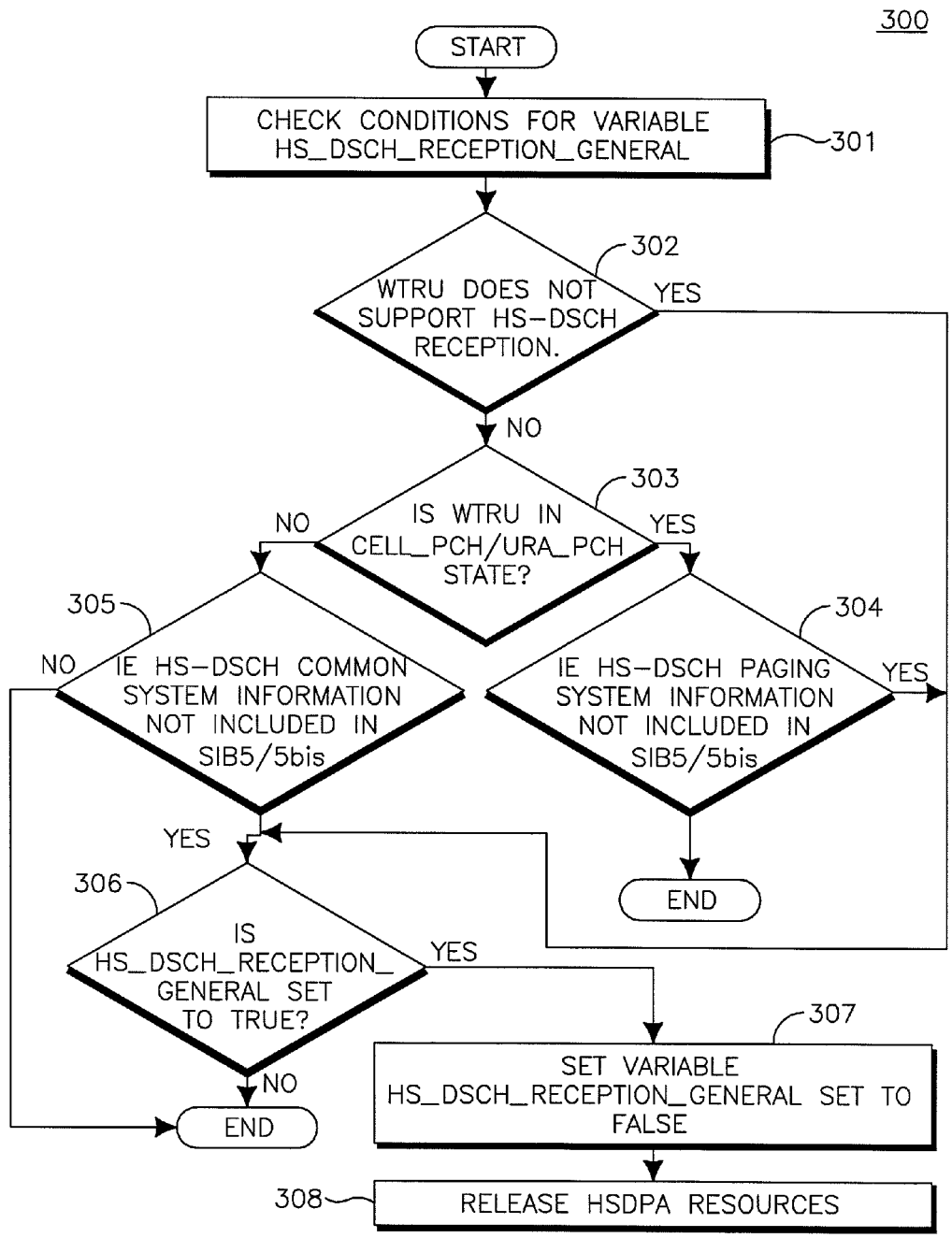
FIG. 3 is a flow diagram of a method for implementing an RRC variable HS_DSCH_RECEPTION_GENERAL, which tracks HS-DSCH reception for all states.

FIG. 3 shows a flowchart of a method 300, which as an example of an implementation of the RRC variable HS_DSCH_RECEPTION_GENERAL according to the above description. The WTRU 110 begins checking conditions for the variable HS_DSCH_RECEPTION_GENERAL (301), which comprises the following checks. If the cell or state in which the WTRU has transitioned to does not support HS-DSCH (302), then the variable HS_DSCH_RECEPTION_GENERAL is checked for TRUE (306). If the variable is TRUE, the variable is set to FALSE (307) and the HSDPA resources are released (308). If HS-DSCH reception is supported (302), and if the WTRU 110 is not in one of the paging states (Cell_PCH/URA_PCH) (303), then the WTRU checks the SIB5/5bis for presence of the IE HS-DSCH common system information (305). If this IE is not present, and the variable HS_DSCH_RECEPTION_GENERAL is TRUE (306), then the variable HS_DSCH_RECEPTION_GENERAL is set to FALSE (307) and HSDPA resources are released (308). If the WTRU 110 is in a paging state (Cell_PCH/URA_PCH) (303) and the IE HS-DSCH paging system information is not included in the SIB5/5bis, then variable HS_DSCH_RECEPTION_GENERAL is checked for whether it is set to TRUE (306). If TRUE, then variable HS_DSCH_RECEPTION_GENERAL is set to FALSE (307) and HSDPA resources are released (308).

HSDPA Variable Applicable to Paging Channel

In another embodiment, a new variable for Cell_PCH/URA_PCH is introduced. The new variable HS_DSCH_RECEPTION_PCH_STATE is used to indicate if HS-DSCH reception is ongoing in Cell_PCH or URA_PCH. In this embodiment, a variable for each state may exist, and the variables are used to evaluate and indicate if HS-DSCH reception is supported when entering a new state.

The WTRU 110 evaluates and performs the actions associated with the following HS_DSCH reception variables that correspond to the state the WTRU 110 is entering:

a. HS_DSCH_RECEPTION_OF_Cell_FACH_STATE;
    b. HS_DSCH_RECEPTION_OF_CCCH_ENABLED is only evaluated when the WTRU 110 moves or stays in Cell_FACH state;
    c. HS_DSCH_RECEPTION_PCH_STATE is evaluated and actions are performed when entering or staying in Cell_PCH state; or
    d. HS_DSCH_RECEPTION is evaluated only when moving or staying or reconfiguring in Cell_DCH.

The WTRU 110 has to evaluate these four variables when HS-DSCH reception criteria is not fulfilled and when it is fulfilled. The rationale behind this procedure is that, when leaving a state or cell, the WTRU 110 may not know in advance if HS-DSCH reception is supported in the new state or cell. However, when entering the state or cell the WTRU 110 will know the results and capabilities of the state/cell, and it can also know what it was previously supporting.

When evaluating the variables, if the requirements to enable HS-DSCH reception in the final state are not met, the actions associated to the variable not being TRUE should be executed. These actions correspond to clearing of HSDPA resources. However, in order for the WTRU 110 to know whether HS-DSCH reception was ongoing prior to state transition or cell reselection, the WTRU 110 checks if any of the other HS_DSCH variables corresponding to its own state and to the other states are set to TRUE at the time. This is an indication that the WTRU 110 had an ongoing HS-DSCH connection and thus it should clear the resources since it cannot support HS_DSCH reception.

In addition to clearing the HSDPA resources, the WTRU 110 also ensures that all other HS_DSCH reception state variables are set to FALSE. Further, the WTRU 110 performs the following:

stop any HS_SCCH reception procedures;
stop any HS-DSCH reception procedures;
clear the variable H_RNTI and remove any stored H-RNTI;
reset the MAC-ehs entity;
release all HARQ resources; and
clear any stored IEs HARQ info.

Optionally, to check if an HS-DSCH reception procedure was ongoing the WTRU 110 may also use the HS_DSCH_RECEPTION_GENERAL variable that it is set forth herein. When the HS-DSCH reception state variable being evaluated is set to FALSE and the HS_DSCH_RECEPTION_GENERAL is set to TRUE, the actions associated to clearing the resources are cleared and the variables are set to FALSE.

Modification of HS-DSCH Reception Variables.

The following are modifications to the existing HS-DSCH reception variables with respect to the paging channel states:
a. A new variable HS_DSCH_RECEPTION_PCH_STATE is monitored for URA_PCH and CELL_PCH states;
b. For the case where HS_DSCH_RECEPTION_OF_CCCH_ENABLED and HS_DSCH_RECEPTION_PCH_STATE is set to FALSE, and any of the four variables indicate that HS-DSCH reception is ongoing, the resources are cleared;
c. The WTRU 110 checks HS_DSCH_RECEPTION and HS_DSCH_RECEPTION_OF_CELL_FACH_STATE if any of the four variables are set to TRUE.

In the case where HS_DSCH_RECEPTION_GENERAL is used to indicate if HS-DSCH reception is ongoing, the actions related to checking if any of the four (4) HS-DSCH reception variables are set to TRUE, are replaced by the action of only checking if HS_DSCH_RECEPTION_GENERAL is set to TRUE.

With respect to the HS_DSCH reception variable for paging channels, variable HS_DSCH_RECEPTION_PCH_STATE is set to TRUE if HS-DSCH reception in CELL_PCH or URA_PCH is ongoing. The variable HS_DSCH_RECEPTION_PCH_STATE is set to FALSE when the WTRU 110 is entering UTRA RRC connected mode when not otherwise stated in the procedure, when the WTRU 110 is leaving UTRA RRC connected mode, and when the WTRU 110 is entering CELL_FACH and CELL_DCH.

Additional Modifications

Some additional modifications may be necessary if the WTRU 110 uses the HS-DSCH reception variables of other states as an indication of an ongoing procedure.

Note that this modification may apply to other embodiments that also rely on the other state HS-DCH reception variables for an in indication that HS-DSCH reception is ongoing. In the case where the HS_DSCH_RECEPTION_GENERAL variable is used as an indication these modifications are not required.

The following modifications may be optionally implemented:
1. The WTRU 110 does not evaluate the actions related to HS_DSCH_RECEPTION when moving out of Cell_DCH;
2. if any IEs related to HS-DSCH are stored in the WTRU 110 clear any stored IE "Downlink HS-PDSCH information". The WTRU 110 does not set the HS_DSCH_RECEPTION_OF_CCCH_ENABLED The variable is set to FALSE only if the conditions to start performing HS-DSCH reception with a dedicated H-RNTI are successfully performed, otherwise it will be set to FALSE when the WTRU 110 fails to perform a HS-DSCH reception procedure.

Alternatively, the WTRU 110 ensures that the HS-DSCH reception variables are set to FALSE when moving out of a state. For example, the variable HS_DSCH_RECEPTION_Cell_FACH_STATE is set to FALSE when moving out of Cell_FACH. However, this should also be done after the configuration of the other state is completed.

Clearing HSDPA Resources During Cell/State Transitions

In this embodiment the existing HS-DSCH reception variables are modified such that when transitioning between cells and states, the HS-DSCH reception procedures are stopped.

When moving out of Cell_DCH, the WTRU 110 clears the HSDPA resources if the WTRU 110 is moving to a state that HS-DSCH reception is not supported. More specifically, the HS_DSCH_RECEPTION variable is modified such that the WTRU 110 can check if HS-DSCH reception will be supported in the other states by the WTRU 110 and the network. This may be done by checking one or a combination of the following conditions:

3. WTRU 110 does not support HS-DSCH reception;
4. Alternatively, if additional WTRU 110 capabilities are added (such as WTRU 110 supports HS-DSCH reception only in Cell_FACH and WTRU 110 supports HS-DSCH reception in Cell_PCH and in Cell_FACH) the WTRU 110 may check for these specific conditions in the respective states;
5. IE "HS-DSCH common system information" is not included in the SIB5/5bis;
6. For Cell_PCH and URA_PCH, the IE "HS-DSCH paging system information" is not included in SIB5/5bis.

If one of the above conditions is TRUE, the WTRU 110 clears all HSDPA resources. This will guarantee that moving from Cell_DCH to any other non-HSDPA state will free all resources and stop HS-DSCH reception procedures.

In addition, when moving from Cell_PCH or URA_PCH state to Cell_FACH state due to cell re-selection, the WTRU 110 requires an indication whether HS-DSCH reception procedure is ongoing. This is required, if the WTRU 110 transitions to another state or performs cell reselection to a cell that does not support HS-DSCH reception. The WTRU 110 should be able to detect that HS-DSCH reception is ongoing and that HSDPA resources are to be cleared. This may be done by the addition of a new HS_DSCH_RECEPTION_PCH_STATE variable that is set to TRUE when the WTRU 110 meets the conditions to start HS-DSCH reception. The variable will be set to FALSE when HS-DSCH reception is stopped.

When performing state transitions and cell re-selections to states such as Cell_FACH, URA_PCH, and Cell_PCH, the conditions to perform HS-DSCH receptions are checked. If they are not met, in addition to performing S-CCPCH reception, the WTRU 110 also performs one of the following:

7. Evaluate the variable HS_DSCH_RECEPTION_OF_Cell_FACH_STATE and perform the corresponding actions: if the requirements are not met and if HS-DSCH reception is ongoing, the HSDPA resources are to be cleared;
8. In order to be able to assess if there are any ongoing HS-DSCH procedures in the current state or in the other states, additional checks should be performed. For example, the WTRU 110 should also check if the HS_DSCH_RECEPTION_OF_CCCH_ENABLED or HS_DSCH_RECEPTION_PCH_STATE or HS_DSCH_RECEPTION_Cell_FACH_STATE is set to TRUE. If any of the variables are set to TRUE then the WTRU 110 clears the resources and sets all the variables to FALSE;

9. The WTRU 110 does not need to check if HS_DSCH_RECEPTION_OF_CCCH_ENABLED is set to FALSE, when evaluating the need to clear HS-DSCH resources.
10. Evaluate the variable HS_DSCH_RECEPTION_OF_CCCH_ENABLED. Additional actions related to the case where the conditions required to setup HS-DSCH reception are not fulfilled.

The WTRU 110 should be capable of checking if any of the HS-DSCH reception variables are set to TRUE (i.e. indicating that HS-DSCH reception is ongoing).

If any variables are set to TRUE, the WTRU 110 should clear all resources and set all the variables to FALSE, evaluate a variable and perform actions according to one of the procedures specified in any of the previous embodiment or as in the specification Lastly, the WTRU 110 must ensure that the variables are set to FALSE when stopping HS-DSCH reception in one state (i.e. when changing from common to dedicated H-RNTI, when changing states, and when changing cells).

Releasing Resources when HS-DSCH Reception Conditions not Met

In another embodiment, the WTRU 110 always releases the resources when the conditions to perform HS-DSCH reception are checked and not fulfilled. Optionally, the WTRU 110 could use a MAC-ehs state indication (e.g. HARQ configured) to determine whether or not the WTRU 110 has an ongoing HSDPA setup.

The proper behaviour when stopping HS-DSCH operation should be specified wherever the following conditions are checked:
  for TDD; or
  for FDD, if the WTRU 110 does not support HS-DSCH reception; or
  if the IE "HS-DSCH common system information" is not included in System Information Block type 5 or System Information Block type 5bis; or
  for TDD; or
  for FDD, if the WTRU 110 does not support HS-DSCH reception; or
  if the IE "HS-DSCH paging system information" is not included.

These conditions are checked in various places, including the following:
  System Information Block 5 and 5bis
  System Information Block 6
  Reception of a Setup/Reconfiguration/Release message by the WTRU 110
  Cell Update, initiation
  Reception of Cell Update Confirm message by the WTRU 110
  Timer T302 expiry or cell reselection
  Initiation (RRC CONNECTION REQUEST)
  Reception of an RRC CONNECTION SETUP When one of these above conditions is satisfied, the proper WTRU 110 behaviour is as follows:
  stop any HS-SCCH reception procedures;
  stop any HS-DSCH reception procedures;
  clear the variable H_RNTI and remove any stored H-RNTI;
  reset the MAC-ehs entities;
  release all HARQ resources;
  clear any stored IEs HARQ info.

Alternatively, the following exemplary instructions for the WTRU 110 clear the HSDPA resources only if HS-DSCH reception is ongoing by checking if any of the state variables are set to TRUE.

Release of HSDPA Resources

If one of the variables HS_DSCH_RECEPTION_Cell_FACH_STATE_ENABLED or HS_DSCH_RECEPTION or HS_DSCH_RECEPTION_OF_CCCH_ENABLED or HS_DSCH_RECEPTION_PCH_STATE_is set to TRUE, the WTRU 110 shall:
11. set the variables HS_DSCH_RECEPTION_Cell_FACH_STATE, HS_DSCH_RECEPTION, HS_DSCH_RECEPTION_OF_CCCH_ENABLED, and HS_DSCH_RECEPTION_PCH_STATE to FALSE;
12. stop any HS_SCCH reception procedures;
13. stop any HS-DSCH reception procedures;
14. clear the variable H_RNTI and remove any stored H-RNTI;
15. reset the MAC-ehs entity;
16. release all HARQ resources; and
17. clear any stored IEs HARQ info.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:
1. A method for cell reselection implemented by a wireless transmit receive unit (WTRU), the method comprising:
  defining a single high speed downlink shared channel (HS-DSCH) reception variable (HS_DSCH_RECEPTION_GENERAL) indicating the status of HS-DSCH reception for the following states: Cell_FACH, Cell_PCH, URA_PCH and Cell_DCH;
  setting the HS_DSCH_RECEPTION_GENERAL variable to TRUE on the condition that HS-DSCH procedures are ongoing;

setting the HS_DSCH_RECEPTION_GENERAL variable to FALSE on the condition that a new cell following a cell reselection does not support HS-DSCH reception; and releasing HS-DSCH resources on the condition that the new cell does not support HS-DSCH reception.

2. The method as in claim 1, wherein releasing HS_DSCH resources comprises:

stopping high speed synchronization control channel (HS-SCCH) reception;

stopping high speed downlink shared channel (HS-DSCH) reception;

clearing radio network temporary identifiers (RNTIs);

resetting a medium access control (MAC) entity;

releasing hybrid automated response request (HARQ) resources; and clearing any stored information elements related to HARQ information.

3. The method as in claim 1, further comprising reading a medium access control (MAC) state indicator to determine HS-DSCH reception.

4. The method as in claim 1, further comprising reading an information element (IE) to determine HS-DSCH reception status in at least one of the following:

system information block (SIB) type 5 or SIB type 5bis.

5. The method as in claim 4, wherein the IE is HS-DSCH common system information.

6. The method as in claim 4, wherein the IE is HS-DSCH paging system information.

7. A wireless transmit receive unit (WTRU) comprising:
a processor configured to:
define a single high speed downlink shared channel (HS-DSCH) reception variable (HS_DSCH_RECEPTION_GENERAL) indicating the status of HS-DSCH reception for the following states: Cell_FACH, Cell_PCH, URA_PCH and Cell_DCH;

set the HS_DSCH_RECEPTION_GENERAL variable to TRUE on the condition that HS-DSCH procedures are ongoing;

set the HS_DSCH_RECEPTION_GENERAL variable to FALSE on the condition that a new cell following a cell reselection does not support HS-DSCH reception; and release HS-DSCH resources on the condition that the new cell does not support HS-DSCH reception.

8. The WTRU as in claim 7, wherein the processor is further configured to:

stop high speed synchronization control channel (HS-SCCH) reception;

stop high speed downlink shared channel (HS-DSCH) reception;

clear radio network temporary identifiers (RNTIs);

reset a medium access control (MAC) entity;

release a hybrid automated response request (HARQ) resources; and clear any stored information elements related to HARQ information.

9. The WTRU as in claim 7, further comprising reading a medium access control (MAC) state indicator to determine HS-DSCH reception.

10. The WTRU as in claim 7, further comprising reading an information element (IE) to determine HS-DSCH reception status in at least one of the following:

system information block (SIB) type 5 or SIB type 5bis.

11. The WTRU as in claim 10, wherein the IE is HS-DSCH common system information.

12. The WTRU as in claim 10, wherein the IE is HS-DSCH paging system information.

* * * * *

UNITED STATES PATENT AND TRADEMARK OFFICE
CERTIFICATE OF CORRECTION

PATENT NO. : 8,184,591 B2
APPLICATION NO. : 12/112103
DATED : May 22, 2012
INVENTOR(S) : Diana Pani, Rocco Di Girolamo and Paul Marinier Page 1 of 1

It is certified that error appears in the above-identified patent and that said Letters Patent is hereby corrected as shown below:

In the Claims:

At column 16, line 19, the text reading "release a hybrid" should be changed to --release hybrid--

Signed and Sealed this
Twenty-third Day of July, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,184,591 B2
APPLICATION NO. : 12/112103
DATED : May 22, 2012
INVENTOR(S) : Diana Pani, Rocco DiGirolamo and Paul Marinier It is certified that error appears in the above-identified patent and that said Letters Patent is hereby corrected as shown below:

In the specification

Column 6, line 62: change "check may done" to --check may be done--

Column 7, line 8: change "Block type 5bis" to --Block type 5bis.--

Column 7, line 41: change "resources when the when the" to --resources when the--

Column 8, line 9: change "actions related the" to --actions related to the--

Column 9, line 18: change "WTRU is operation on," to --WTRU is operating on,--

Column 9, line 27: change "HSDPA in the its current" to --HSDPA in its current--

Column 11, line 10: change "that it is set forth" to --that is set forth--

Column 11, line 50: change "variables for an in indication" to --variables for an indication--

Column 11, line 62: change "DSCH_RECEPTION_OF_CCCH_ENABLED" to --DSCH_RECEPTION_OF_CCCH_ENABLED.--

Column 13, line 16: change "specification" to --specification.--

Signed and Sealed this
Fifteenth Day of March, 2016

Michelle K. Lee
*Director of the United States Patent and Trademark Office*